(12) United States Patent
Sayuda

(10) Patent No.: US 7,359,094 B1
(45) Date of Patent: Apr. 15, 2008

(54) IMAGE PROCESSING APPARATUS AND IMAGE FORMING MEDIUM

(75) Inventor: Hiroyuki Sayuda, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 641 days.

(21) Appl. No.: 09/629,464

(22) Filed: Jul. 31, 2000

(30) Foreign Application Priority Data

Dec. 15, 1999 (JP) ............................... 11-356024

(51) Int. Cl.
G06K 15/00 (2006.01)
H04N 1/40 (2006.01)

(52) U.S. Cl. .................... 358/3.28; 358/3.01; 358/1.18

(58) Field of Classification Search .............. 358/3.28, 358/1.18, 3.2, 3.3–3.32, 1.9, 448
See application file for complete search history.

(56) References Cited

U.S. PATENT DOCUMENTS

| | | | | |
|---|---|---|---|---|
| 5,278,400 | A * | 1/1994 | Appel | 358/3.28 |
| 5,710,636 | A * | 1/1998 | Curry | 358/3.28 |
| 5,721,788 | A * | 2/1998 | Powell et al. | 382/100 |
| 5,884,014 | A * | 3/1999 | Huttenlocher et al. | 358/1.15 |
| 6,034,680 | A * | 3/2000 | Kessenich et al. | 715/733 |
| 6,138,151 | A * | 10/2000 | Reber et al. | 709/219 |
| 6,256,398 | B1 * | 7/2001 | Chang | 382/100 |
| 6,456,393 | B1 * | 9/2002 | Bhattacharjya et al. | 358/1.9 |
| 6,577,748 | B2 | 6/2003 | Chang | |
| 6,681,028 | B2 * | 1/2004 | Rodriguez et al. | 382/100 |
| 6,819,776 | B2 | 11/2004 | Chang | |

FOREIGN PATENT DOCUMENTS

| | | |
|---|---|---|
| DE | 1998 3484 | 7/2001 |
| JP | 10-200743 | 7/1998 |
| JP | 10-228468 | 8/1998 |
| JP | 10-289239 | 10/1998 |
| JP | 11-203381 | 7/1999 |
| JP | 2002-523944 | 7/2002 |
| WO | WO-0011599 | 3/2000 |

OTHER PUBLICATIONS

HTML by Example, by Ann Navarro & Todd Stauffer, © 2000 Que, pp. 44-48 and 166-167.*
HTML Programmer's Reference, by Thomas A. Powell and Dan Whitworth, © 1998 Osbourne/McGraw-Hill, pp. 364-375. This reference also demonstrates that URL's in general are either absolute paths or relative paths.*
Wakita et al., "A Study For Linking Between WWW And Paper By 2D Code", Human Interface 76-1, Information Media 33-1, 1998, pp. 1-6.

* cited by examiner

*Primary Examiner*—David Moore
*Assistant Examiner*—James A. Thompson
(74) *Attorney, Agent, or Firm*—Morgan, Lewis & Bockius LLP

(57) ABSTRACT

The present invention performs printing without collapsing the appearance of the hyper document and embeds information about links in the printed hyper document so that access to the link destinations can be gained. The image processing apparatus of the present invention has a plotting control unit that, when outputting document data onto a recording medium as a document image, the document data having image elements containing link destinations and containing appearance information for defining the plotting positions of the image elements, plots the image elements in the plotting positions defined by the appearance information and embeds at least part of coupling information for specifying related information of the image elements in the plotting positions of the image elements.

11 Claims, 19 Drawing Sheets

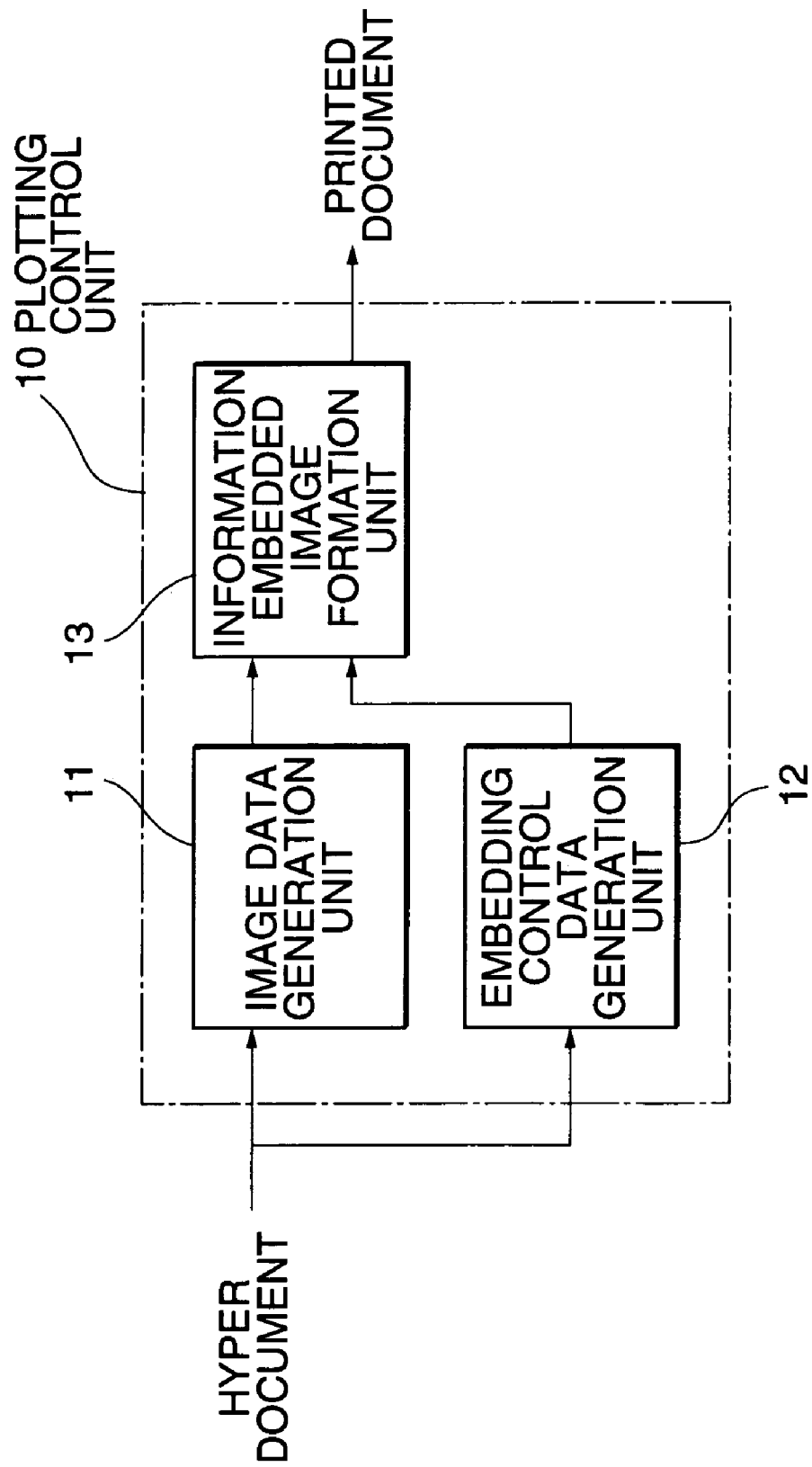

FIG.4A

| (x,y) | LINK INFORMATION |
|---|---|
| (81,204) | product/2000 |
| (723,409) | http://centreware.fujixerox.co.jp/ |
| (434,1229) | release/990921.html |

FIG.4B

| (x,y) | LINK INFORMATION (ABSOLUTE PATH) |
|---|---|
| (81,204) | http://www.fujixerox.co.jp/product/2000 |
| (723,409) | http://centreware.fujixerox.co.jp/ |
| (434,1229) | http://www.fujixerox.co.jp/release/990921.html |

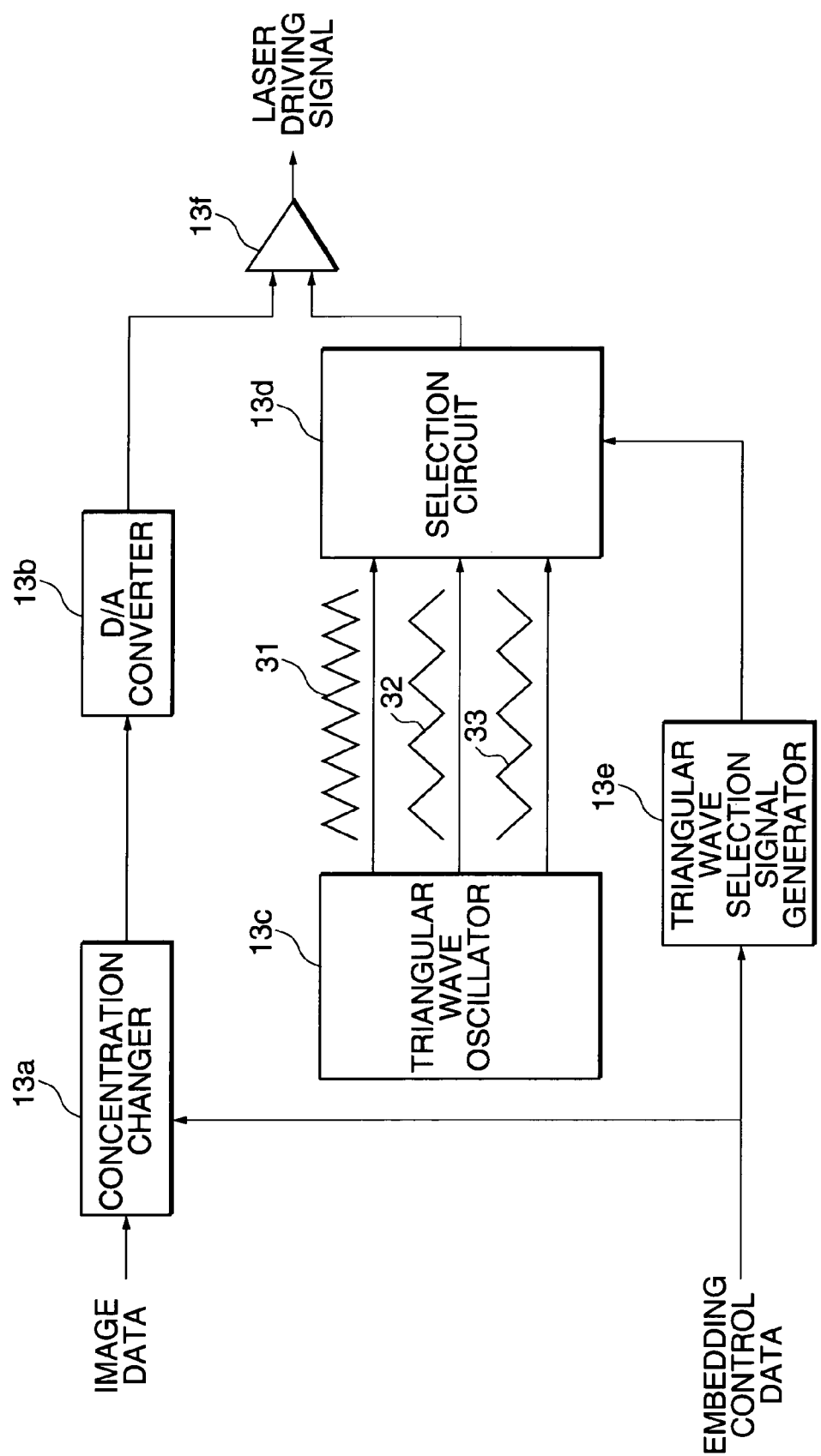

FIG.13A

| (x,y) | LINK INFORMATION |
|---|---|
| (81,204) | product/2000 |
| (723,409) | http://centreware.fujixerox.co.jp/ |
| (434,1229) | release/990921.html |

FIG.13B

| LINK ID (HEXADECIMAL) | LINK INFORMATION (ABSOLUTE PATH) |
|---|---|
| 81F948013450AE1300000001 | http://www.fujixerox.co.jp/product/2000 |
| 81F948013450AE1300000002 | http://centreware.fujixerox.co.jp/ |
| 81F948013450AE2B00000001 | http://www.fujixerox.co.jp/release/990921.html |

FIG.13C

| (x,y) | DATA TO BE EMBEDDED (LINK ID) |
|---|---|
| (81,204) | 81F948013450AE1300000001 |
| (723,409) | 81F948013450AE1300000002 |
| (434,1229) | 81F948013450AE2B00000001 |

IMAGE PROCESSING APPARATUS AND IMAGE FORMING MEDIUM

BACKGROUND OF THE INVENTION

1. Field of the Invention

The present invention relates to an image processing apparatus that outputs, as an image, document data containing information for accessing related information, such as hyper document data written in, e.g., HTML (Hyper Text Markup Language), embedding information for specifying the related information, and an image forming medium onto which the image has been outputted.

2. Description of the Prior Art

In recent years, with widespread use of computers, many documents are electronically generated. Particularly, because of the evolution of network technologies as typified by the Internet, many electronic documents take a form called hyper documents that have links for associating information (hereinafter referred to as related information) such as related texts, image elements, sound, and video with image elements constituting the texts, such as text bodies, pictures, and graphics. For example, in electronic documents written in HTML, which is a sort of hyper document, a link is implemented by describing URL (Uniform Resource Locator) indicating the location of related information. Such hyper documents can be generally browsed by information browsing software called a browser. Furthermore, by pointing to image elements constituting the documents with an indicator called a mouse, related information of the image elements can be quickly browsed or reproduced.

By the way, the hyper documents may be printed out on recording media such as paper in almost the same appearance in which they are browsed by a browser, by common printers of the ink-jet system, electrophotography (xerography system), and the like. Since such printout on paper is superior in visibility and transportability than output onto electronic display media such as a display, it is widely being used in offices in general and homes.

However, hyper documents simply printed out have a problem in that, since only visible information of information contained in the hyper documents is recorded and information about links and the like is not outputted directly on paper, the characteristics (properties) of the hyper documents are lost, with the result of reduced usability. To be more specific, to gain access to related information, the user must take the trouble to leave the printed documents, browse electronic hyper documents, search for a corresponding image element, and point to it with a mouse.

Therefore, to solve such a problem, there are conventionally proposed technologies by which hyper document is printed out with link information embedded on paper so that access to related electronic information from the paper document is enabled.

There is disclosed in, e.g., Japanese Published Unexamined Patent Application No. Hei 10-228468 a system that embeds coupling information for associating written information such as text bodies and graphics having links with pertinent linked related information in proper areas of the document in the form of two-dimensional codes and prints out the document. According to the system, when accessing the linked related information, the user marks the corresponding written information with a marking pen and lets a scanner scan it. By analyzing the scanned image and specifying the selected written information, the system makes access to corresponding link information.

There is also disclosed in, e.g., Japanese Published Unexamined Patent Application No. Hei 10-289239 a system having a part that provides selection disabling information for judging whether marking points are valid, added to the above-described system.

There is further disclosed in, e.g., Japanese Published Unexamined Patent Application No. Hei 11-203381 a system that converts a URL in HTML document into an image represented as two-dimensional codes and prints out the document, inserting the image immediately after a reference portion (a portion of the URL). According to the system, when accessing linked related information, the user scans in an image portion represented as two-dimensional codes with a camera. By analyzing the two-dimensional codes and converting them into a URL, the system makes access to the related information.

However, although the conventionally proposed technologies eliminate the trouble to temporarily leave paper documents to access related information and browse electronic hyperdocument documents, problems as described below might arise.

The system disclosed in, e.g., Japanese Published Unexamined Patent Application No. Hei 10-228468 has the drawbacks that: 1) a paper document is smudged because of marking with a marking pen or the like; 2) a paper document once having been marked cannot be used again; and 3) scanning in the entire paper document by a scanner to analyze marked written information and coupling information of two-dimensional code requires much time for the scanning and analysis, disabling a quick access to linked information.

Although the system disclosed in, e.g., Japanese Published Unexamined Patent Application No. Hei 11-289239 solves the above-described drawback 2) by providing selection disabling information to enable the use of an identical paper document a plural number of times, the drawbacks 1) and 3) are not solved.

The system disclosed in, e.g., Japanese Published Unexamined Patent Application No. Hei 11-203381 is free from the above-described drawbacks 1) to 3) but has the drawback that the insertion of an image represented as two-dimensional codes collapses the appearance (plotting positions of image elements) of the original HTML document, so it cannot apply to documents important in appearance. Particularly, where plural URLs are embedded in different points of one picture, such as functions called clickable maps, application of the system is difficult. This is because a collapsed appearance would make it impossible for the user to determine which two-dimensional code corresponds to a URL to be referenced.

In other words, there exists a problem in that, although various technologies are proposed to print a hyper document, embedding information about links contained therein on paper and enable access to electronic related information from the paper document, the conventional technologies of scanning the entire document for analysis require much time for access to related information or limits applicable hyper documents to maintain appearances.

SUMMARY OF THE INVENTION

The present invention has been made in view of the above circumstances and provides an image processing apparatus and an image forming medium that, for any hyper document, embeds information for accessing related information in corresponding image elements without collapsing the appearance and enables a quick access to the related information.

The present invention provides an image processing apparatus, including: an input part that inputs document data and coupling information for specifying related information related to an image element constituting a document image; and an embedding part that embeds the coupling information to be superimposed over at least part of the image element to form the document image of the document data inputted by the input part.

According to the image processing apparatus configured as described above, since coupling information for specifying related information is embedded to be superimposed over at least part of the image element, the appearance of the image is not collapsed because of the coupling information or the amount of collapse is minimized. Therefore, if the image processing apparatus is used, by scanning only the image element or its vicinity for analysis, related information related to the image element can be accessed.

The present invention also provides an image forming medium on which an image constituted of image elements is formed, wherein coupling information for specifying related information related to the image elements is superimposed over at least part of the image elements.

According to the image forming medium configured as described above, since an image is formed in such a way that coupling information for specifying related information related to an image element is superimposed over at least part of the image element, the appearance of the image element in the image formation position does not collapse, and by scanning, for example, only the image element or its vicinity for analysis, related information related to the image element can be accessed. Thus, if the image forming medium is used, the user can instantly access related information with an operation sense similar to directions by a mouse by using, e.g., a small-size scanner.

BRIEF DESCRIPTION OF THE DRAWINGS

Preferred embodiments of the present invention will be described in detail based on the followings, wherein:

FIG. 1 is a block diagram showing the configuration of major parts of an image processing apparatus according to a first embodiment of the present invention;

FIG. 2 illustrates concrete examples of image forming media onto which hyper document is printed out.

FIG. 4 illustrates concrete examples of link information contained in data, FIG. 4A shows an example of link information of relative path expression, and FIG. 4B shows an example of link information of absolute path expression;

FIG. 5 is a block diagram showing an example of an information embedding image formation unit in the first embodiment of the present invention;

FIG. 13 illustrates concrete examples of link information contained in data, FIG. 13A shows an example of link information of relative path expression, FIG. 13B shows an example of link information of absolute path expression, and FIG. 13C shows an example of link IDs;

DESCRIPTION OF THE PREFERRED EMBODIMENTS

Figure 2A:
FIG. 2A shows an example of an image forming medium according to the present invention.

Hereinafter, an image processing apparatus and an image forming medium according to the present invention will be described based on the accompanying drawings.

First Embodiment

FIG. 1 is a block diagram showing the configuration of major parts of an image processing apparatus according to a first embodiment of the present invention. Used as image processing apparatuses of the present embodiment are a computer as a host apparatus connected to a printer, the printer, and the like. Specifically, on receiving document data written in, e.g., HTML, the image processing apparatus of the present embodiment performs processing required to print it out as a hyper document on a recording medium such as paper, or prints it out. For printout, the prior arts such as electrophotography, the ink-jet system, and the like may be used. Conceivable as input of data to the image processing apparatus are input of image data and print description languages from a host apparatus, input of image data via the Internet, and entry of data from a keyboard.

Document data received by the image processing apparatus is assumed to include appearance information to define the plotting positions of image elements such as text bodies, pictures, and graphics on a hyper document. Although the appearance information basically defines the appearance of the hyper document, some hyper documents describe only logical semantics of individual image elements such as, e.g., paragraphs without definitely defining appearances. Usually, for such a hyper document, a browser or an image processing apparatus converts logical information into appearance information according to predetermined rules and displays or prints it. That is, in this case, the appearance of image elements is determined based on the logical information. Accordingly, in this specification, document data having only the logical information will also be assumed to contain information to define appearances.

Document data received by the image processing apparatus is assumed to contain link information for accessing related information. The link information is used to associate image elements plotted on a hyper document with information related to them. For example, if document data is written in HTML, link information is represented by URL, which indicates a place in which related information is stored.

To print out such document data as a hyper document, the image processing apparatus has a plotting control unit 10, which generates output data for printout. More specifically, the plotting control unit 10, to generate the output data, has an image data generation unit 11, an embedding control data generation unit 12, and an information embedding image formation unit 13.

The image data generation unit 11, based on appearance information contained in the received document data, generates image data to be plotted, that is, image data necessary for printing out the document data as a hyper document.

The embedding control data generation unit 12 generates control data necessary for embedding information (thereinafter referred to as coupling information) for specifying related information from link information contained in the received document data in the hyper document, that is, embedding control data for controlling the information embedding image formation unit 13.

The information embedding image formation unit 13 generates output data (pixel data) to be printed out on a recording medium, based on the image data generated by the image data generation unit 11 and the embedding control data generated by the embedding control data generation unit 12.

The plotting control unit 10 having the image data generation unit 11, the embedding control data generation unit 12, and the information embedding image formation unit 13 may be embodied by a combination of, e.g., a CPU (Central Processing Unit) for executing a proper program, a ROM (Read Only Memory) for storing the program, and a RAM (Random Access Memory) used as a work area of the CPU.

Figure 2B:
FIG. 2B shows an example of a conventional image forming medium.

FIG. 2A shows a concrete example of output data generated by the plotting control unit 10, outputted as a document image on a recording medium. FIG. 2A shows an example of printing out document data written in HTML by the image processing apparatus of the present embodiment. For comparison, FIG. 2B shows a concrete example of printing out the identical HTML document data based on the appearance information by a conventional image processing apparatus. In comparison of the examples, although appearances such as layout are nearly identical between the two, the configuration of pixels plotted in areas 21, 22, and 23 shown in FIG. 2A are microscopically different from that in ordinary plotting areas. That is, in these areas 21, 22, and 23, as will be described in detail later, coupling information related to image elements viewed in the vicinity of the areas is embedded.

Figure 3:
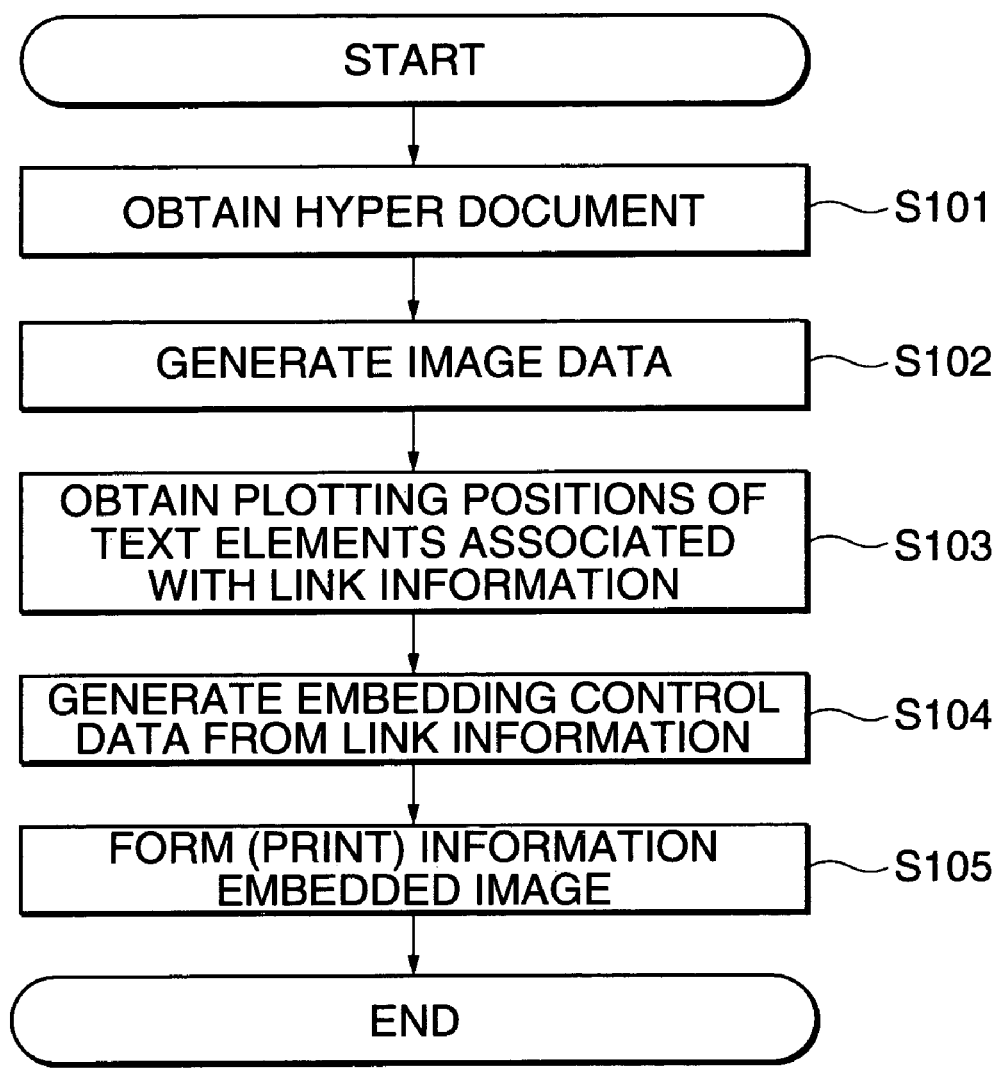
FIG. 3 is a flowchart giving the outline of the procedure for printing hyper document in the first embodiment of the present invention.

Here is a brief description of the operation of a thus configured image processing device for printing out document data as a hyper document. FIG. 3 is a flowchart giving the outline of the procedure for printing a hyper document.

To perform printing, the image processing apparatus first obtains the entity of the hyper document to be printed, that is, the document data from which to generate the hyper document, from the outside of the apparatus (step 101, thereinafter steps will be simply referred to as "S").

Upon acquisition of the document data, the image data generation unit 11 generates image data from the document data, based on appearance information contained in the document data (S102). The embedding control data generation unit 12 extracts link information contained in the document data, obtains the plotting position of an image element corresponding to it from the appearance information (S103), and generates embedding control data for the information embedding image formation unit 13 from the extracted link information (S104).

Finally, as will be described in detail later, the information embedding image formation unit 13 generates pixel data in which the coupling information has been embedded, based on the image data generated by the image data generation unit 11 and the embedding control data generated by the embedding control data generation unit 12, and forms an image by the pixel data in a printer engine not shown or the like (S105).

FIGS. 4A and 4B are drawings for explaining in more detail the processing of the above-described S103 and S104. The example shows the upper-left coordinates (xy coordinates) of image elements (corresponding to the areas 21, 22, and 23) in which related information exists on the HTML document shown in FIG. 2A, and link information corresponding to the related information. Since the document data received by the image processing apparatus contains the upper-left coordinates and link information as shown in the drawings, the embedding control data generation unit 12 performs the above-described S103 processing based on them.

The link information includes relative positional representation (relative path) and absolute positional representation (absolute path), and usually includes relative path representation as shown in the first and third lines of data of FIG. 4A. A relative path additionally requires reference positional information to access related information. For example, the HTML document shown in FIG. 2A has positional information of "http://www.fujixerox.co.jp/."

For this reason, the embedding control data generation unit 12, before performing the above-described S104 processing, changes all pieces of the link information to absolute path representation as shown in FIG. 4B, to eliminate the need to obtain reference positional data for accessing related information and individually associate each of pieces of the link information with one image element. In other words, to specify related information itself, the link information is changed to absolute path representation. Although link information may be relative path representation, in that case, the reference positional information "http://www.fujixerox.co.jp/" must be embedded in a proper area on the HTML document.

The embedding control data generation unit 12 generates embedding control data for the information embedding image formation unit 13 from the link information. Specifically, the embedding control data generation unit 12 converts the link information as text data into digital codes represented by a code value "0" or "1" and uses them as embedding control data. Accordingly, the embedding control data is basically generated from the above-described code values (the embedding control data contains other control information also).

Next, referring to FIGS. 5 to 10, a detailed description will be made of the above-described S105 processing and the information embedding image formation unit 13 that performs the processing. FIG. 5 is a block diagram showing an example of the information embedding image formation unit 13. The information embedding image formation unit 13 has: a concentration changer 13a; a D/A converter 13b; a triangular wave oscillator 13c; a selection circuit 13d; a triangular wave selection signal creator 13e; and a comparator 13f. Portions after a laser driving signal outputted from the comparator 13f are not described in detail here because the well-known electrophotography is used.

The concentration changer 13a recognizes the concentration value of image data from the image data generation unit 11 and increases or decreases the concentration in accordance with the concentration value and embedding control data. The D/A converter 13b converts the inputted image data (digital concentration information) into an analog voltage and outputs it to one input terminal of the comparator 13f. The triangular oscillator 13c generates triangular waves 32 and 33 for creating a line screen as a basic element of an embedding area, and triangular waves 32 and 33 having a cycle double that of the triangular wave 31. The selection circuit 13d selects any of the generated triangular waves 31, 32, and 33, and outputs it to another input terminal of the comparator 13f. The triangular wave selection signal creator 13e sends a selection signal based on the embedding control data and controls selection processing by the selection circuit 13d. The comparator 13f compares the analog voltage of the input image and the level (analog voltage) of the triangular waves, and when the level of the triangular waves is greater than the analog voltage of the input image, outputs "H" (turns a laser ON); when smaller, outputs "L" (turns the laser OFF). A portion after the laser driving signal plots pixels on a recording medium in response to the laser ON command.

Figure 6:
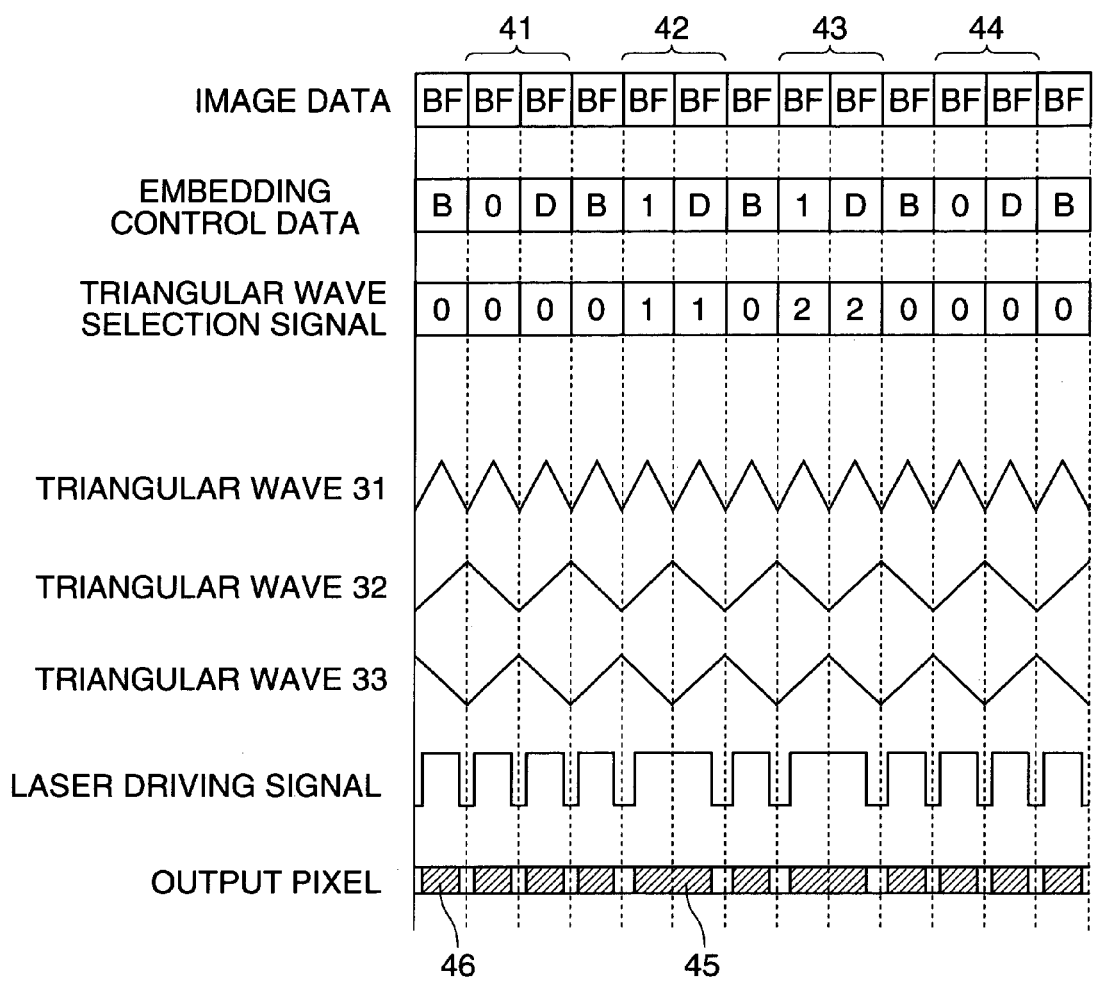
FIG. 6 illustrates an example of information embedding processing in the first embodiment of the present invention.

FIG. 6 is a drawing for explaining that four bits of code values 0, 1, 1, and 0 are embedded in proper portions 41, 42, 43, and 44 at a given interval in the area of image data of BF (hexadecimal number). The image data is represented by hexadecimal numbers "0" to "FF"; greater values denote higher image concentration. In this example, the image data is all "BF", denoting approximately 75%.

The embedding control data is basically generated from the code values of embedded data; the portion (two consecutive pixels) in which the code value "0" is embedded is "0" "D", and the portion (two consecutive pixels) in which the code value "1" is embedded is "1" "D". Other embedding control data is "B", denoting a blank.

Triangular wave selection signals are generated from embedding control data and the timing in which the data appears. When embedding control data is "B", "0", and "0", followed by "D", the signal "0" for selecting a triangular wave 31 is generated. When embedding control data is "1" and "1", followed by "D", either of the signal "1" or "2" for selecting a triangular wave 32 or 33 is generated when the triangular wave becomes upward convex.

As seen from the above description, in the portions in which the code value "1" is embedded, two pixels are coupled to plot a large pixel such as a pixel 45, and in other portions, small pixels such as a pixel 46 are plotted.

Figure 7:
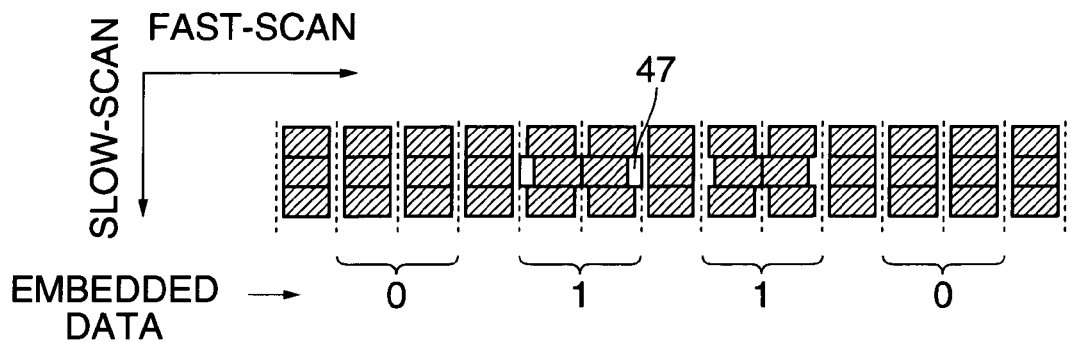
FIG. 7 illustrates part of an information embedded image plotted in the first embodiment of the present invention.
Figure 8:
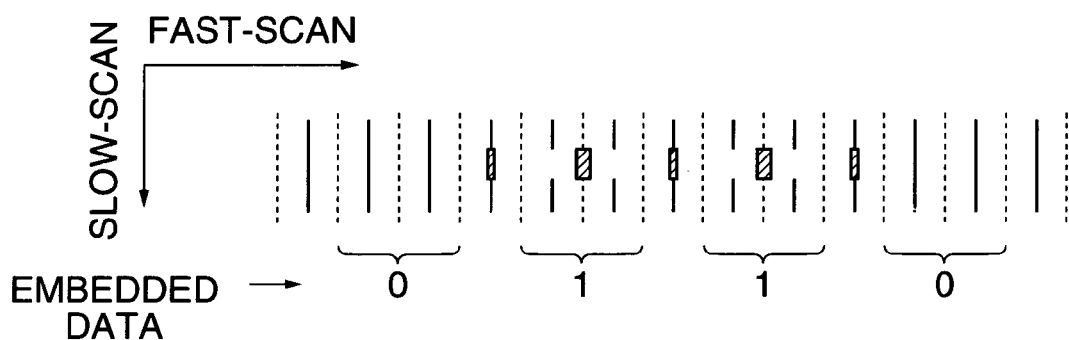
FIG. 8 illustrates part of an information embedded image (low concentration) plotted in the first embodiment of the present invention.
Figure 9:
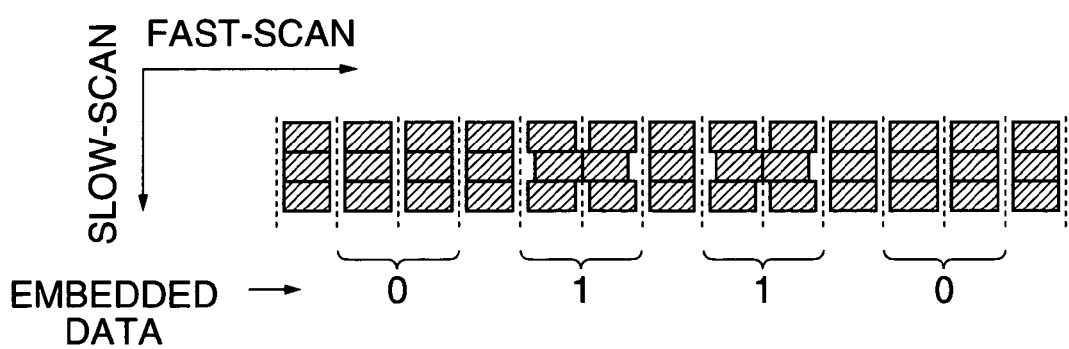
FIG. 9 illustrates part of an information embedded image (high concentration) plotted in the first embodiment of the present invention.

FIG. 7 shows lines on which no code value is embedded, plotted above and below the scan lines on which the code values of link information described in FIG. 6 are embedded (the image data is all "BF"). The image is basically plotted with a line screen generated by the triangular wave 31; for example, provided that the number of lines is about 200 (about 200 lines per inch), the portion 47 in which the code value "1" is embedded is switched to about 100 lines' worth of screen.

Where the image concentration at the portion in which a specific code is embedded is lower or higher than a predetermined value, the concentration is changed by the concentration changer 13a. FIG. 8 is a drawing for explaining that four bits of code values "0", "1", "1", and "0" are embedded at a given interval in the area of image data of 0D (hexadecimal number; image concentration of approximately 5%). If the image data of the portion in which the code value "1" is embedded is lower than a predetermined lower limit "33" (image concentration of approximately 20%), it is increased to "33" by the concentration changer 13a. FIG. 9 is a drawing for explaining that four bits of code values "0", "1", "1", and "0" are embedded at a given interval in the area of image data of E6 (hexadecimal number; image concentration of approximately 90%). If the image data of the portion in which the code value "1" is embedded is higher than a predetermined upper limit "CC" (image concentration of approximately 80%), it is decreased to "CC" by the concentration changer 13a. In this way, by limiting the portions in which the code value "1" is embedded, to middle concentrations of approximately 20 to 80%, the portions in which the code value "1" is embedded can be specified from the output waveforms of charge coupled devices (hereinafter referred to as CCD) of an image scanner.

Figure 10:
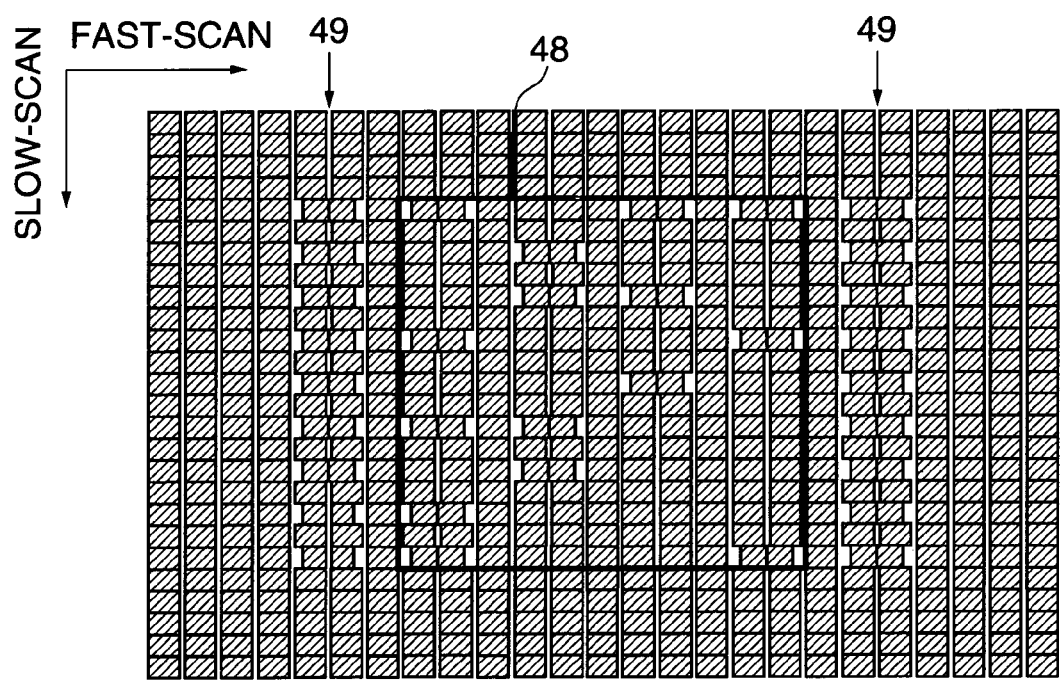
FIG. 10 illustrates a concrete example of an information embedded image plotted in the first embodiment of the present invention.

FIG. 10 shows an example that code values are embedded in an area 48 within an image having a concentration of approximately 75%. In this example, the code values "1"s for identifying the position of the area 48 are embedded in the fast-scanning direction (area 49 in the figure) and code values of 36 bits (4 bits in the fast-scanning direction (9 lines in the slow-scanning direction) are embedded in the area 48.

The size of an embedding area is determined by the amount of codes to be embedded. In the examples of the areas 21, 22, and 23 shown in FIG. 2A, the height of the slow-scanning direction is fixed and the length of the fast-scanning direction is variable depending on the amount of codes.

In this way, the information embedding image formation unit 13 embeds the link information converted into digital codes in the plotting positions of corresponding image elements as coupling information for specifying related information. Specifically, at the upper-left area of the plotting position of an image element, coupling information corresponding to the image element is embedded to be superimposed thereon and the image element can be viewed. The image data in which the coupling information has been embedded is used as output data for printout onto a recording medium. Accordingly, if the output data is outputted onto a recording medium as a hyper document image, the HTML document as shown in FIG. 2A is obtained.

As has been described above, in the image processing apparatus of the present embodiment, an image element making up a hyper document is plotted in accordance with an appearance defined by appearance information, and coupling information for specifying related information related to the image element is embedded in the plotting position of the image element to be superimposed over at least part of the element. In the present embodiment, in a recording medium onto which a hyper document is printed out, image elements are plotted in plotting positions defined by appearance information, and coupling information for specifying related information of the image elements is also plotted in the plotting position of the image elements to be superimposed over at least part of the image elements.

Therefore, according to the image processing apparatus of the present embodiment or a recording medium outputted from the image processing apparatus, for example, by scanning and analyzing only image elements on the outputted hyper document or areas in the vicinity of them, without the need to take the trouble to temporarily leave the hyper document on the medium and browse an electronic hyper document, access to related information related to the image elements could be instantly gained with an operation sense similar to directions by a mouse by using, e.g., a small-size scanner. Moreover, in this case, the user has only to scan only a desired image element or areas in the vicinity of it without the need to scan and analyze the entire hyper document, so that he can gain instant access to related information. Since the printed hyper document never collapses in its original appearance, the present invention is applicable to any hyper document and provides excellent visibility to users. Moreover, since the appearance of the hyper document does not collapse, if coupling information is embedded, e.g., in the upper-left area of image elements and the rule (the existence of the coupling information in the upper-left position) is announced to users, the users can easily recognize where to scan on the hyper document, so that they can easily access related information.

In the image processing apparatus of the present embodiment, as coupling information embedded to be superimposed over image elements, link information indicative of the location of related information, more specifically, e.g., URL, is plotted in the form of digital codes. Accordingly, by analyzing (decoding) the related information, the related information can be correctly accessed. If the coupling information is embedded based on link information of absolute path representation, related information can be accessed more quickly. Moreover, if the embedding position of coupling information converted into digital codes is made visible, the users can gain access to related information more easily.

Second Embodiment

Next, an image processing apparatus and an image forming medium in a second embodiment of the present invention will be described.

Figure 11:
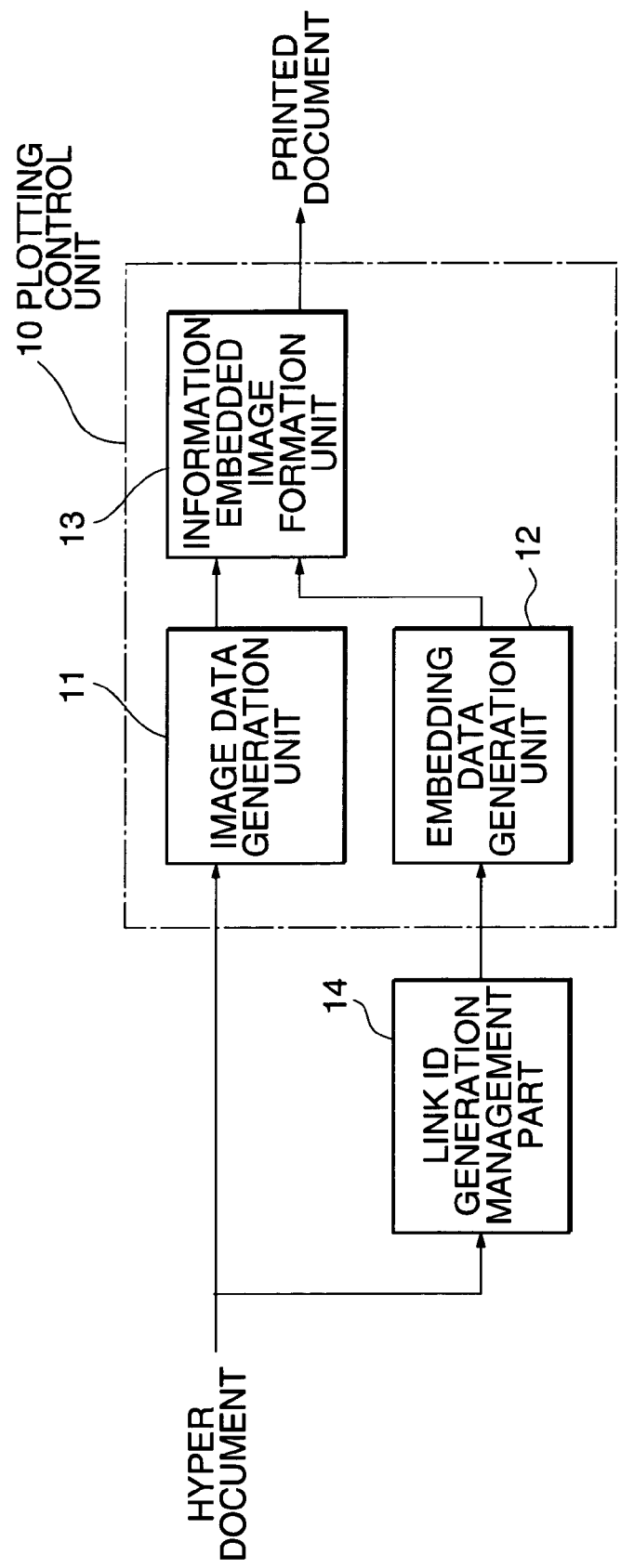
FIG. 11 is a block diagram showing the configuration of major parts of an image processing apparatus according to a second embodiment of the present invention.

FIG. 11 is a block diagram showing the configuration of major parts of an image processing apparatus according to a second embodiment of the present invention. In FIG. 11, components identical to those in the first embodiment are identified by the same reference numbers. The image processing apparatus of the present embodiment has a link ID generation management unit 14, in addition to the parts shown in FIG. 1. The link ID generation management unit 14 may be provided outside the image processing apparatus.

The link ID generation management unit 14 generates an ID (identification) for each of pieces of link information contained in received document data, and manages correspondences between the IDs and pieces of the link information. Hereinafter, the ID will be referred to as a "link ID".

Figure 12:
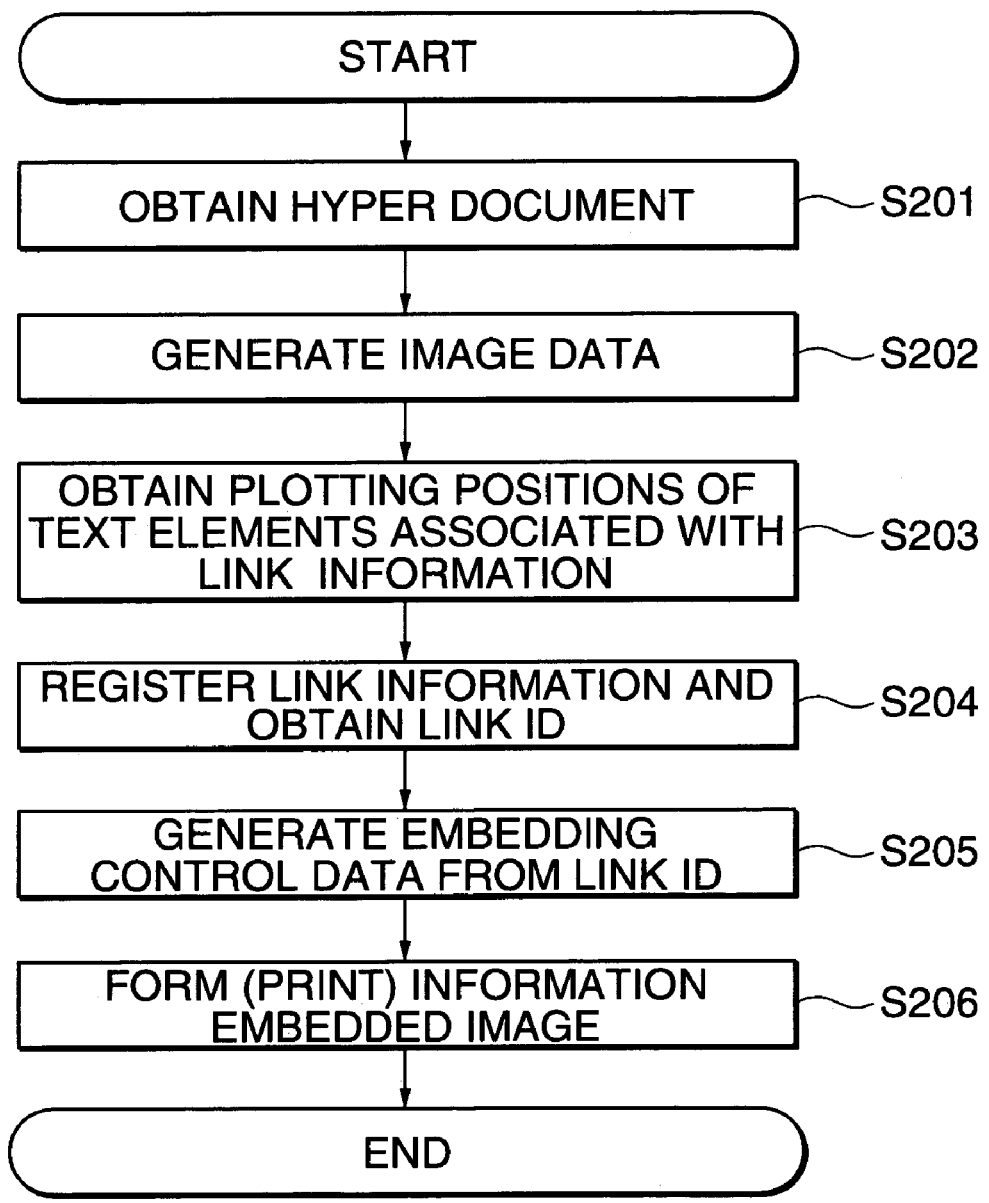
FIG. 12 is a flowchart giving the outline of the procedure for printing hyper document in the second embodiment of the present invention.

Here is a brief description of the operation of a thus configured image processing device for printing out document data as a hyper document. FIG. 12 is a flowchart giving the outline of the procedure for printing a hyper document.

To perform printing, the image processing apparatus first obtains the entity of the hyper document to be printed (S201), and the image data generation unit 11 generates image data from appearance information (S202). The embedding control data generation unit 12 extracts link information and obtains the plotting position of an image element corresponding to it from the appearance information (S203).

The embedding control data generation unit 12 registers the extracted link information in the link ID generation management unit 14 and obtains a corresponding link ID from the link ID generation management unit 14 (S204). Embedding control data is generated from the link ID obtained by the embedding control data generation unit 12 (S205). The information embedding image formation unit 13 performs processing necessary for forming an image, based on the embedding control data (S206).

FIGS. 13A and 13C are drawings for explaining in more detail the processing of the above-described S203 and S204. In S203, as shown in FIG. 13A, the correspondence between the upper-left coordinates of the image element containing the link information and link information associated with them is extracted. In S204, the link information of relative path representation is converted into absolute path representation, which is registered in the link ID generation management unit 14 to obtain a corresponding link ID. The link ID generation management unit 14 manages correspondences between link IDs and pieces of link information, as shown in FIG. 13B.

In the example of FIG. 13B, a link ID has 12 bytes—the first four bytes containing an identification number of the link ID generation management unit 14, the next four bytes containing a link information registration date, and the last four bytes containing an issuance serial number at each date (approximately 4.2 billions). Accordingly, there is no limit on the number of pieces of link information that can be substantially managed.

Although subsequent image formation is performed in the same way as in the first embodiment, data embedded in each area is the digital code equivalent of a link ID as shown in FIG. 13C. Consequently, coupling information, which is data embedded, was variable in length in the first embodiment, but has a fixed length of 12 bytes in the present embodiment.

Figure 14:
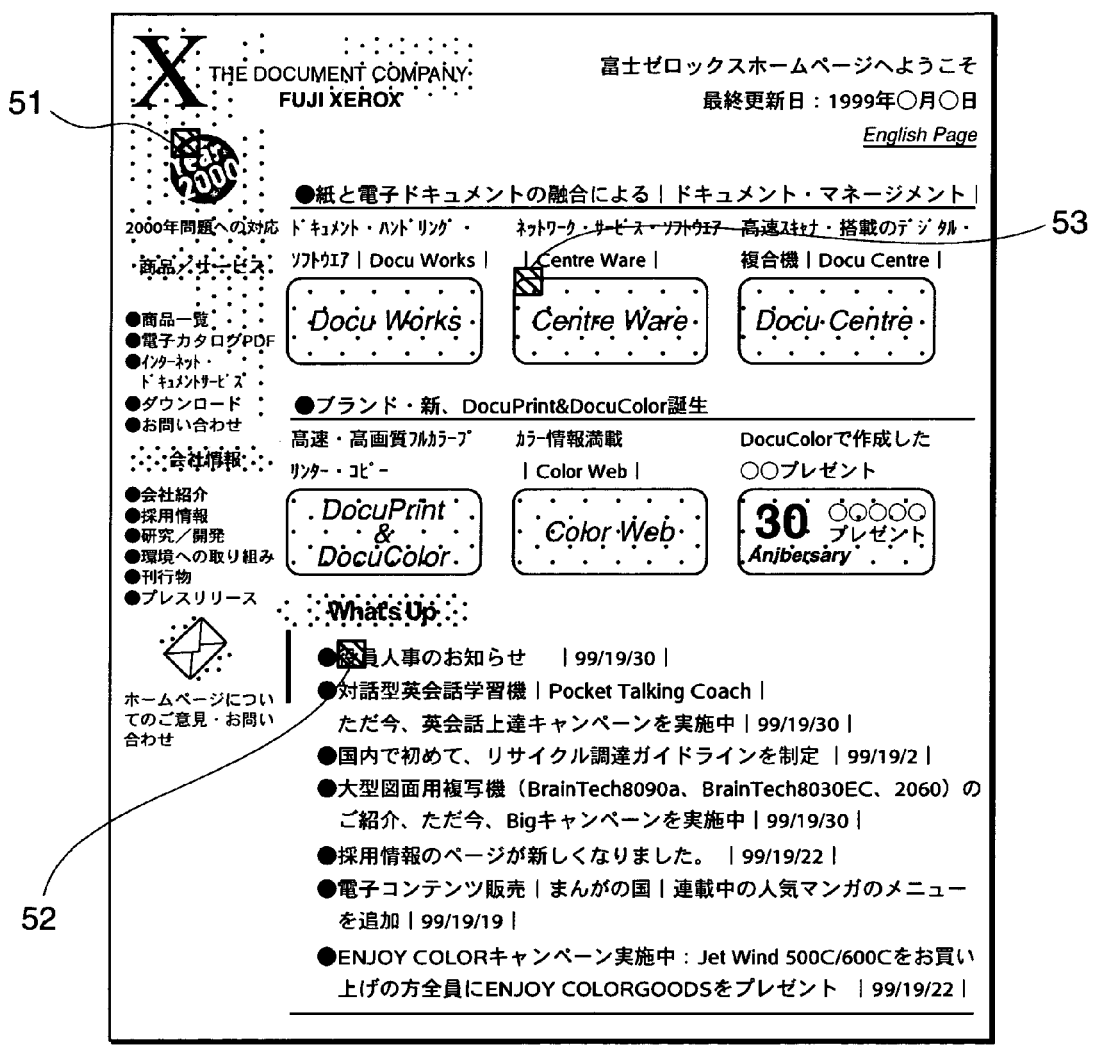
FIG. 14 illustrates a concrete example of an image forming medium according to the second embodiment of the present invention.

Accordingly, as in the image processing apparatus of the present embodiment, by creating a link ID individually corresponding to each piece of link information and managing the correspondence between the link ID and the piece of link information in the link ID generation management unit 14, for example, as shown in FIG. 14, necessary coupling information could be embedded in areas 51, 52, and 53 smaller than the areas 21, 22, and 23 of FIG. 3.

Specifically, since the image processing apparatus of the present embodiment embeds coupling information based on a link ID, which is identification information indicative of the location of related information, to be superimposed over an image element, the necessary coupling information can be embedded in a smaller area. Hence, the image processing apparatus of the present embodiment provides the same effect as the first embodiment and yet is very suitable for maintaining the appearance of a hyper document.

The link ID generation management unit 14 is used to gain access to linked related information; details will be given later.

Although, in the above-described first and second embodiments, the examples were described which coupling information is embedded in a manner that embeds code values on one line of a line screen, the present invention is not limited to the above-described embodiments. For example, identical codes may be embedded successively over plural lines in the slow-scanning direction.

Although, in the above-described first and second embodiments, images basically configured with line screens were used for description, of course, other screens such as dot screens may also be used.

The above-described first and second embodiments may also be applied to color images made up of plural planes (e.g., YMCK). In this case, coupling information may be embedded for all the planes or only for specific planes.

Although, in the above-described first and second embodiments, examples of application of the present invention to an electrophotographic image processing apparatus were described, the present invention is not limited to the above-described embodiments. It goes without saying that the present invention is applicable to any image processing apparatus that forms images with pixels, such as ink jet printers and printing machines.

Third Embodiment

Next, an image processing apparatus and an image forming medium in a third embodiment of the present invention will be described.

Figure 15:
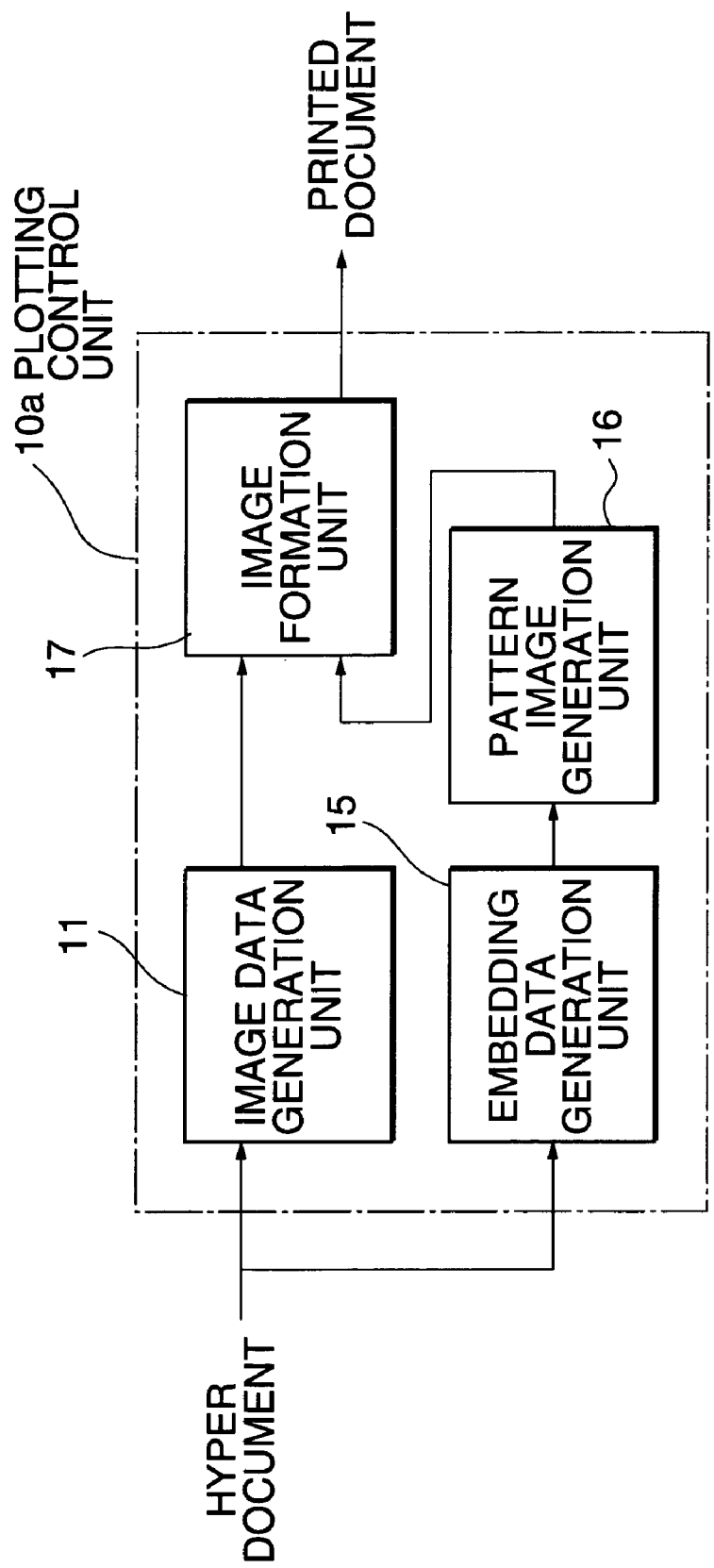
FIG. 15 is a block diagram showing the configuration of major parts of an image processing apparatus according to a third embodiment of the present invention.

FIG. 15 is a block diagram showing an example of an information embedding image formation unit in the first embodiment of the present invention. In FIG. 15, components identical to those in the third embodiment are identified by the same reference numbers. In the image processing apparatus of the present embodiment, a plotting control unit 10a has the image data generation unit 11, the embedding data generation unit 15, the pattern image generation unit 16, and the image formation unit 17.

The image data generation unit 11, like that in first embodiment, generates image data to be plotted, based on appearance information defined within the hyper document or the user's directions.

The embedding data generation unit 15, from link information contained in received document data, generates control data necessary for embedding coupling information in a hyper document, that is, embedding data for controlling the pattern image generation unit 16.

The pattern image generation unit 16 generates two-dimensional pattern images, based on embedding data generated by the embedding data generation unit 15. The two-dimensional pattern images referred to here are a representation of information contents by use of image patterns of predetermined rules on a two-dimensional plane, such as two-dimensional codes called glyphs. It goes without saying that the two-dimensional pattern images are applicable even if they are existing techniques other than glyphs.

The image formation unit 17 synthesizes the image data generated by the image data generation unit 11 and the pattern images generated by the pattern image generation unit 16 to generate output data (pixel data) for printout onto a recording medium.

Figure 16:
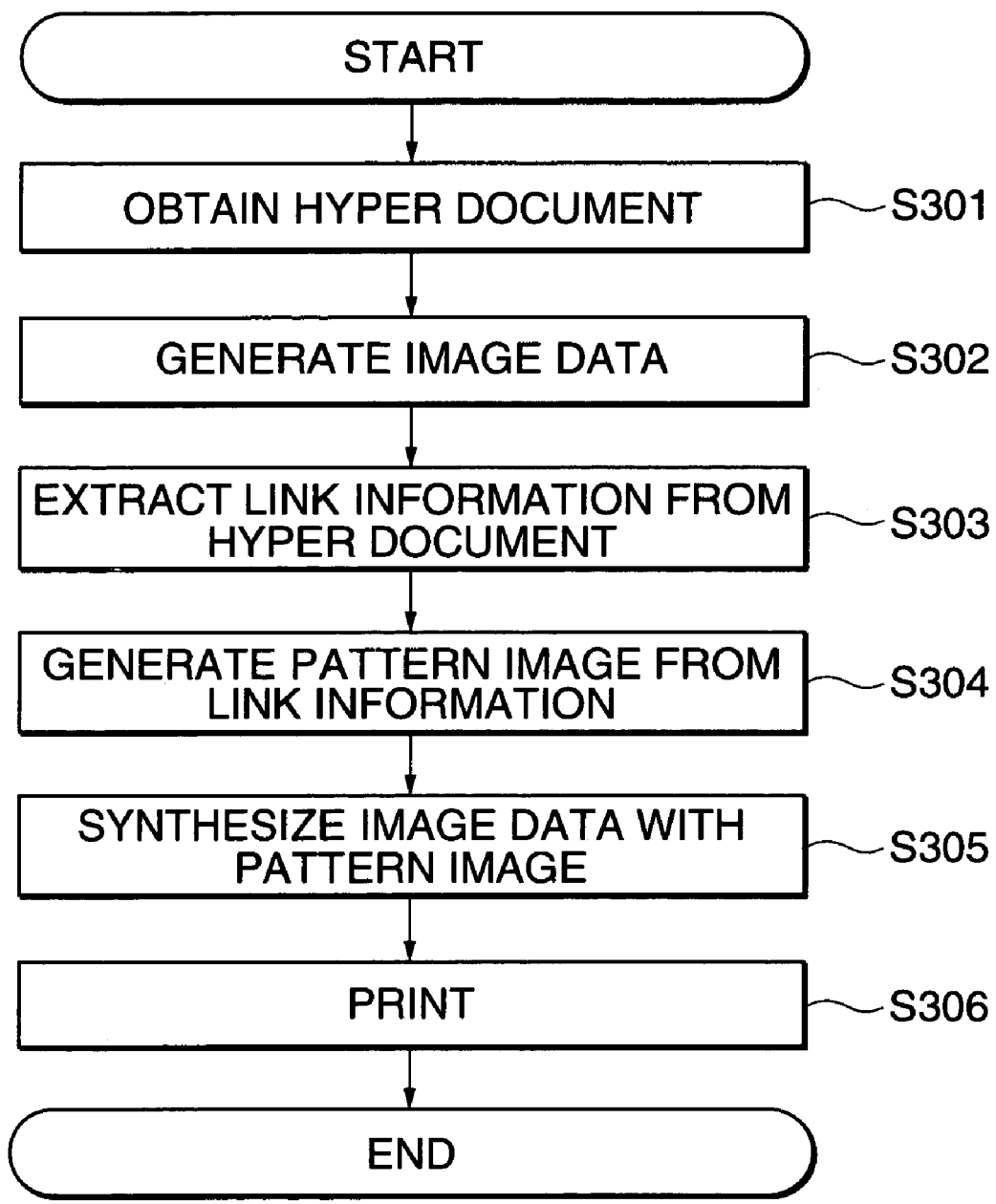
FIG. 16 is a flowchart giving the outline of the procedure for printing hyper document in the third embodiment of the present invention.

Here is a brief description of the operation of a thus configured image processing device for printing out document data as a hyper document. FIG. 16 is a flowchart giving the outline of the procedure for printing a hyper document.

To perform printing, the image processing apparatus first obtains the entity of a hyper document to be printed (S301), and the image data generation unit 11 generates image data from appearance information (S302). Next, the embedding data generation unit 15 extracts link information (S303), and the pattern image generation unit 16 generates a two-dimensional pattern image from the extracted link information (S304).

Finally, the image formation unit 17 synthesizes the image data and pattern image and performs processing necessary for forming an image (S305). The image formation unit 17 plots the pattern image by using toner or ink that is invisible to human eyes but readable to machines (S306). Materials to constitute such toner or ink include, e.g. an infrared absorbent.

Figure 17:
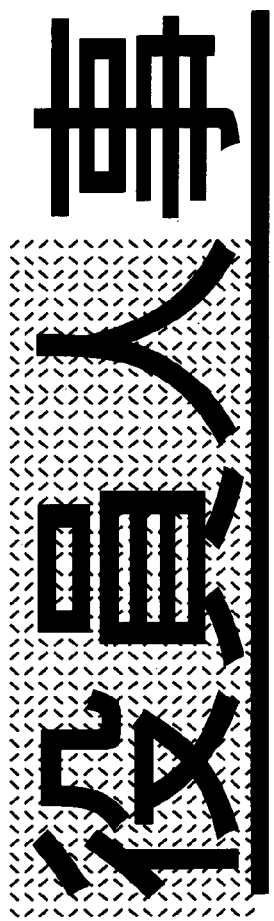
FIG. 17 illustrates an example of an image element printed out in the third embodiment of the present invention and coupling information.

FIG. 17 shows that pattern images are superimposed over the Japanese text "役員人事" (means change of (company) officers) in the area 22 shown in FIG. 2A wherein two-dimensional codes called glyphs are used as the pattern images. If the two-dimensional codes are plotted with, e.g., an infrared absorbent, they become invisible to human eyes. The pattern images can be read by using a scanner (an image scanner) that can sense infrared light, and link information can be extracted by decoding two-dimensional codes indicated by the pattern images.

Thus, the image processing apparatus of the present embodiment plots two-dimensional pattern images for embedding coupling information in an image element as images invisible to human eyes. Accordingly, since the image processing apparatus of the present embodiment provides the same effect as the above-described first embodiment and can embed coupling information in image elements without impairing the visibility of the image elements, it is very suitable for maintaining the appearance of a hyper document.

The pattern images may be plotted in a toner color or form in which they are difficult to identify to human eyes, instead of invisible materials such as infrared absorbents. Difficult to identify to human eyes are, e.g., images produced in light yellow or cyan. Moreover, the pattern images may be plotted with visible color materials by using, e.g., the technology proposed in Japanese Published Unexamined Patent Application No. Hei 11-184958. Specifically, for example, pattern images are plotted in C (cyan) and text is plotted in K (black), and superimposing portions of the pattern images and the text are plotted in the color of the pattern images. In this way, by using an image scanner supporting color images, pattern images can be read, and link information can be extracted by decoding two-dimensional codes indicated by the pattern images.

Figure 18:
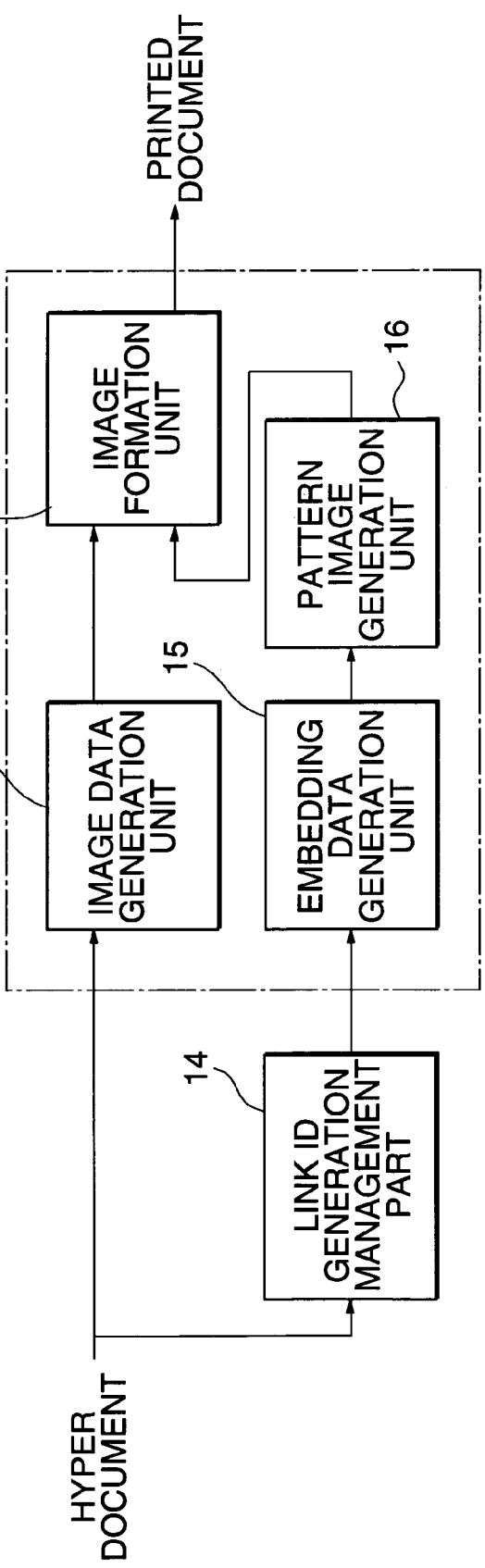
FIG. 18 is a block diagram showing the configuration of major parts of a variant of an image processing apparatus according to a third embodiment of the present invention.

The pattern images may be not the two-dimensional code equivalent of link information itself but the two-dimensional code equivalent of link ID as described in the second embodiment. In other words, as shown in FIG. 18, if the image processing apparatus adopts the configuration in which the link ID generation management unit 14 is provided in addition to the parts shown in FIG. 15, since the plotting area of the pattern images can be minimized, the image processing apparatus becomes more suitable for maintaining the appearance of a hyper document.

To indicate the existence of links to users, a hyper document is usually generated making the attributes (colors of text and graphics frames, etc.) of image elements containing link information different from those of other image elements. Hence, the users browsing by a browser can determine implicitly whether a particular image element has a link embedded. Accordingly, also in the recording medium (a print) in the above-described embodiments, since information is embedded in a proper area (e.g., an upper-left portion within the image elements) in the vicinity of them, the user can presume areas in which a link is embedded. However, to more definitely designate areas in which information related to links is embedded, image elements within the areas, background colors, concentrations, or the like may be changed within a range in which the contents of the image elements can be visually checked.

Fourth Embodiment

Figure 19:
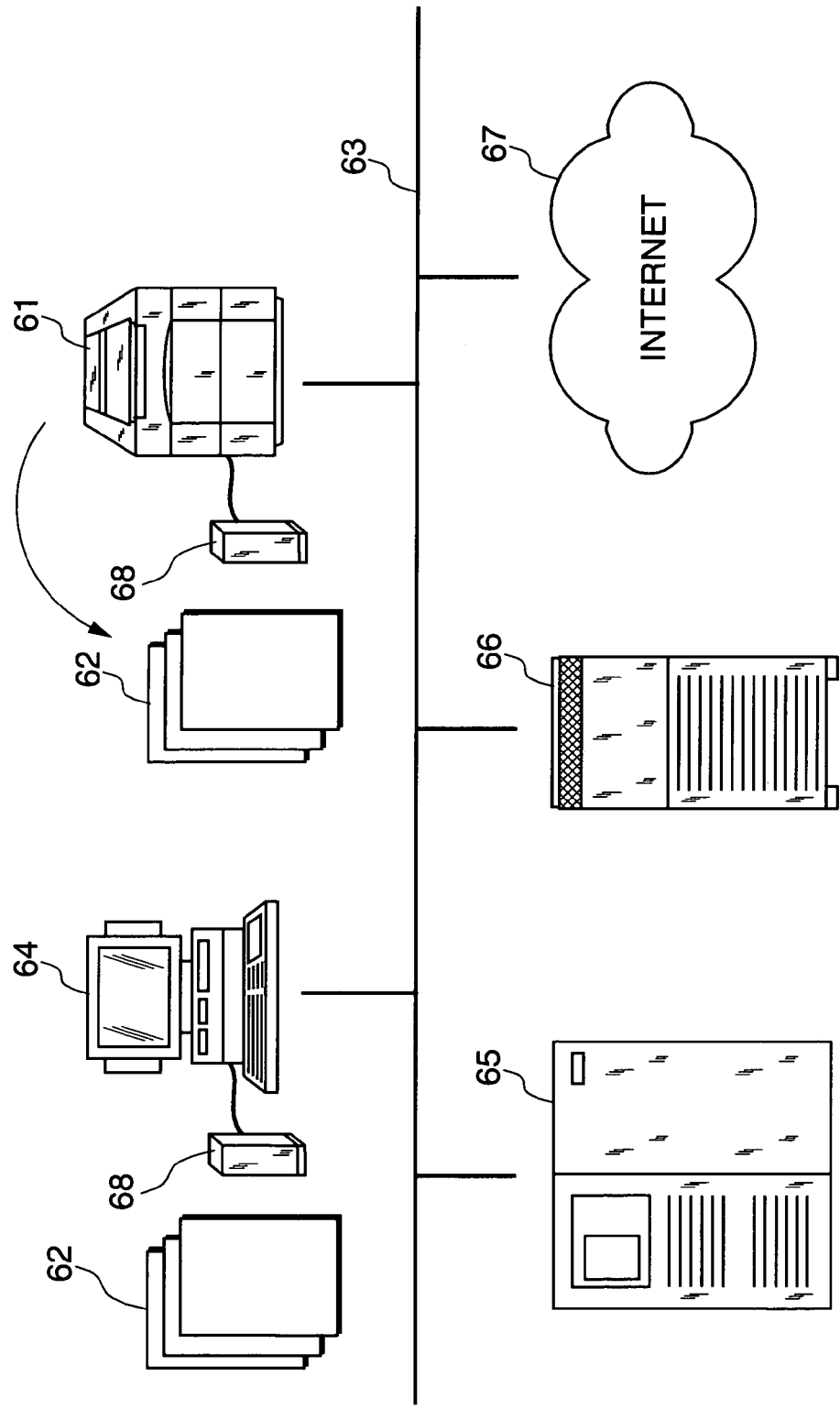
FIG. 19 is a schematic diagram of a system for accessing linked related information from an image forming medium according to the present invention.

Next, a description will be made of a system that makes access to linked related information by using prints of a hyper document in which the coupling information as described in the first to third embodiments is embedded. FIG. 19 is a schematic diagram showing a system that makes access to linked related information by using prints of a hyper document in which coupling information is embedded.

In the figure, an the image formation apparatus 61 corresponds to one of the image processing apparatuses of the present invention, that is, the image processing apparatuses described in the first to third embodiments. Prints 62 correspond to image forming media, that is, recording media on which a hyper document has been printed out in the image formation apparatus 61.

Connected to the image formation apparatus 61 via a network 63 are a computer 64 such as a personal computer and a workstation; a WWW (World Wide Web) server 65; and an ID server 66 having the function of the link ID generation management unit 14. The network 63 is also connected to the Internet 67 of a global network, and a variety of apparatuses on the network 63 can communicate with external WWW servers.

A small-size scanner 68 is connected to each of the image formation apparatus 61 and the computer 64. The small-size scanner 68 reads out, from a hyper document printed out onto the prints 62, an image in an area in which coupling information based on link information or link ID is embedded. The light source of the small-size scanner 68 contains infrared light and the CCDs functioning as light receiving elements are also capable of receiving infrared light. Therefore, the prints 62 described in the first or second embodiment are scanned by the small-size scanner 68 to which an infrared light absorption filter is attached. The prints 62 onto which the two-dimensional codes described in the third embodiment are plotted with an infrared absorbent are scanned by the small-size scanner 68 to which an infrared permeable (visible light absorption) filter is attached.

The computer 64 to which such a small-size scanner 68 is connected analyzes an image scanned by the small-size scanner 68, detects link information or link ID contained in the image, and makes access to linked related information, based on the detection result. This function itself may be implemented using the prior art. The image formation apparatus 61 to which the small-size scanner 68 is connected also has this function, which allows the user to instantly print out related information without using the computer 64. Any of the small-size scanner 68 connected to the image formation apparatus 61 and the small-size scanner 68 connected to the computer 64 is provided with a button for selecting an output destination of related information so that an output destination (the image formation apparatus 61 or computer 64) of accessed related information can be selected according to the user's directions.

The WWW server 65 manages HTML document. The ID server 66 is used only when a link ID described in the second embodiment is used, to be more specific, when coupling information based the link ID is embedded for printing, and when linked related information is accessed using the print.

In a system thus configured, a description will be made of the outline of processing operations during access to linked related information by use of the print 62 of a hyper document in which coupling information is embedded.

Figure 20:
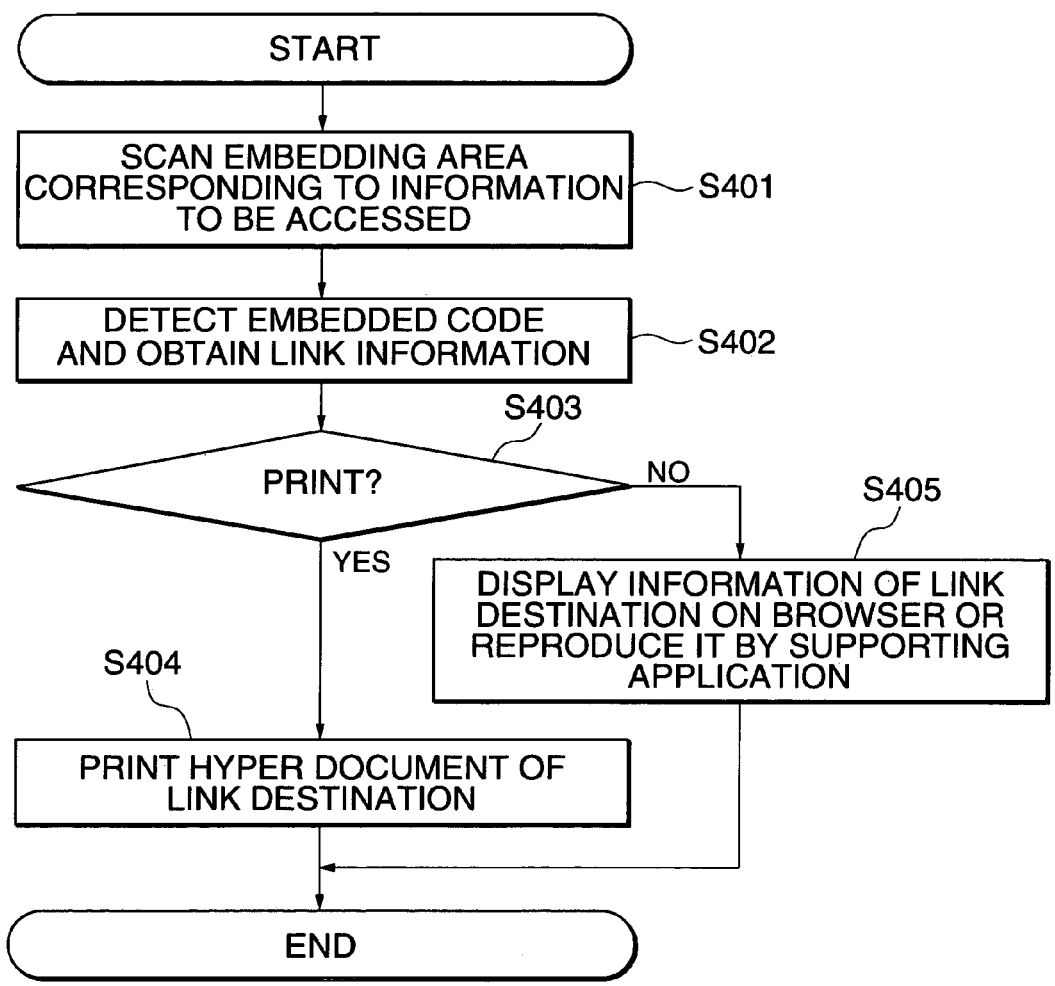
FIG. 20 is a flowchart giving the outline of processing operations during access to linked related information from an image forming medium according to the first or third embodiment of the present invention.

First, a description will be made of access to linked related information from the print 62 described in the first or third embodiment. FIG. 20 is a flowchart showing the outline of processing operations in this case.

In this case, while following user operations, the small-size scanner 68 scans an area in which link information to information that the user wishes to access from the print 62 is embedded (S401). The image formation apparatus 61 or computer 64 connected with the small-size scanner 68 detects coupling information (digital codes) embedded in the area and obtains link information (S402).

On obtaining the link information, the image formation apparatus 61 or computer 64 judges whether directions are given from the user manipulating the small-size scanner 68, and if printout is directed (Yes in S403), access is made to the linked WWW server 65 or the like, based on the obtained link information, to obtain related information (e.g., HTML document data) from the WWW server 65 or the like, and printout is made in the image formation apparatus 61 (S404). On the other hand, if output in the computer 64 is directed (No in S403), the image formation apparatus 61 or computer 64 displays related information obtained from the WWW server 65 or the like on a browser in the computer 64, or reproduces it by starting a supporting application (S405).

Figure 21:
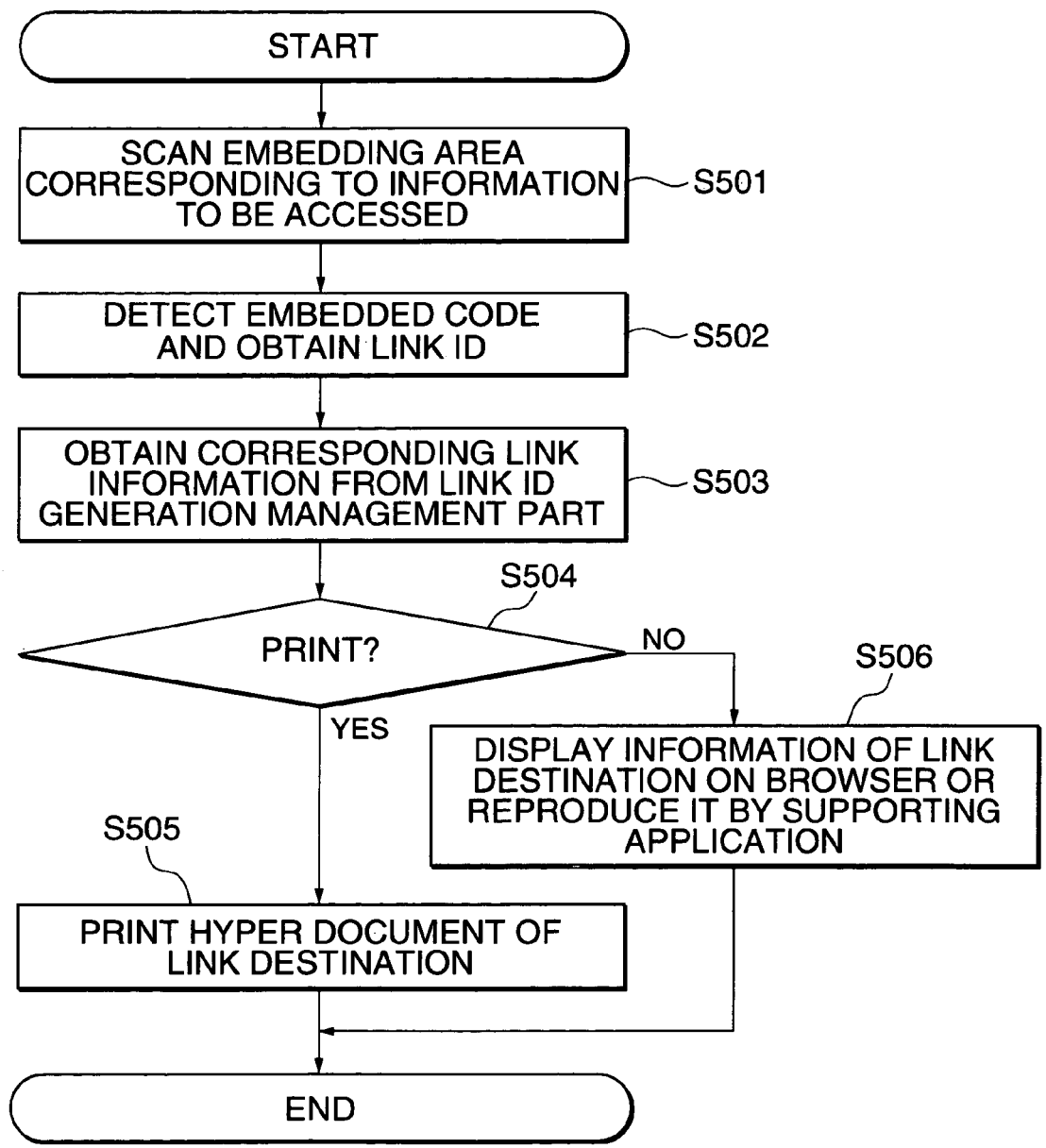
FIG. 21 is a flowchart giving the outline of processing operations during access to linked related information from an image forming medium according to the second embodiment of the present invention.

Next, a description will be made of the case of making access to linked related information from the prints 62 described in the second embodiment. FIG. 21 is a flowchart giving the outline of processing operations in this case.

Also in this case, embedding areas are scanned by the small-size scan 68 as in the above-described case (S501). During scanning by the small-size scanner 68, the image formation apparatus 61 or computer 64 connected with the small-size scanner 68 detects coupling information (digital codes) embedded in a relevant area and obtains a link ID (S502).

On obtaining the link ID, the image formation apparatus 61 or computer 64 communicates with the link ID generation management unit 14 of the ID server 66 and obtains link information corresponding to the obtained link ID (S503). If printout is directed from the user manipulating the small-size scanner 68 (Yes in S504), access is made to the linked WWW server 65 or the like, based on the obtained link information, to obtain related information (e.g., HTML document data) from the WWW server 65 or the like, and printout is made in the image formation apparatus 61 (S505). On the other hand, if output in the computer 64 is directed (No in S504), related information obtained from the WWW server 65 or the like is displayed on a browser in the computer 64, or is reproduced by starting a supporting application (S506).

The right of access to a link destination depends on the setting of the linked WWW server 65 or the like independently of the spirit of the present invention. Therefore, a detailed description thereof is omitted.

As has been described above, according to an image processing apparatus or an image forming medium of the present invention, since coupling information for specifying related information related to an image element is embedded to be superimposed over at least part of the image element, the appearance of the image does not collapse or the amount of collapse is minimized. By analyzing coupling information of the image element or its vicinity, related information related to the image element can be accessed.

What is claimed is:

1. An image processing apparatus, comprising:
   an image data generation unit that generates an image data including an image element based on a document data, the document data including link information that indicates a location of related information related to the image element and appearance information that defines a position of the image element in the image data;
   an embedding data generation unit that receives identification information corresponding to the link information and is smaller than the link information in data size, and configured to generate a control data to embed the identification information by superimposing the image element based on the appearance information; and
   an embedded image formation unit that generates pixel data to be formed on a recording medium based on the image data and the control data, the pixel data including the identification information superimposed over the image element, wherein
   the image element excludes any one of the link information, the related information and the identification information.

2. The image processing apparatus according to claim 1, wherein the link information is URL.

3. The image processing apparatus according to claim 1 further includes an image forming unit that forms the pixel data on the recording medium in a state that the identification information is accessible by a user.

4. The image processing apparatus according to claim 1 further includes an identification information management unit.

5. The image processing apparatus according to claim 4, wherein the embedding data generation unit extracts the link information from the document data, registers the extracted link information in the identification information management unit, and receives the identification information corresponding to the link information from the identification information management unit in response to the registration.

6. The image processing apparatus according to claim 1, wherein the embedded image formation unit generates the pixel data in a form or in a color that is difficult to identify the identification information visually.

7. An image processing method, comprising:
   generating an image data including an image element based on a document data, the document data including link information that indicates a location of related information related to the image element and appearance information that defines a position of the image element in the image data;
   receiving identification information corresponding to the link information that is smaller than the link information in data size;
   generating a control data to embed the identification information by superimposing over the image element based on the appearance information; and
   generating pixel data to be formed on a recording medium based on the image data and the control data, the pixel data including the identification information superimposed over the image element, wherein
   the image element excludes any one of the link information, the related information and the identification information.

8. The image processing method according to claim 7, wherein the link information is URL.

9. The image processing method according to claim 7 further comprising forming the pixel data on the recording medium in a state that the identification information is accessible by a user.

10. The image processing method according to claim 7, further comprising:
    extracting the link information from the document data;
    registering the extracted link information; and
    receiving the identification information corresponding to the link information in response to the registration.

11. The image processing method according to claim 7, wherein the generating the pixel data to be formed on the recording medium includes generating the pixel data in a form or in a color that is difficult to identify the identification information visually.

* * * * *